United States Patent Office 3,423,461
Patented Jan. 21, 1969

3,423,461
2-AMINO- OR AMINOALKYLENE-10',11'-DIHYDRO-
SPIRO[CYCLOPROPANE - 1,5' - 5H-DIBENZO-(a,d)
CYCLOHEPTENES] AND THE SALTS THEREOF
Carl Kaiser, Haddon Heights, N.J., and Charles L. Zirkle,
Berwyn, Pa., assignors to Smith Kline & French Laboratories, Philadelphia, Pa., a corporation of Pennsylvania
No Drawing. Filed Oct. 19, 1965, Ser. No. 498,151
U.S. Cl. 260—570.5                         7 Claims
Int. Cl. A61k 27/00; C07c 91/16; C07d

ABSTRACT OF THE DISCLOSURE

Amino derivatives of 10',11'-dihydrospiro[cyclopropane - 1,5' - 5H-dibenzo(a,d)cycloheptenes] wherein the amino moiety may be primary, secondary or tertiary including cyclic amino and the dibenzocycloheptene ring may be halogen, trifluoromethyl, lower alkyl, lower alkoxy or lower alkylthio substituted, have antidepressant activity. The compounds are generally prepared via the 10',11' - dihydrospiro[cyclopropane - 1,5' - 5H - dibenzo (a,d)cycloheptene]-2-carboxylic acids.

This invention relates to novel substituted 10',11'-dihydrospiro[cyclopropane - 1,5' - 5H-dibenzo(a,d)cycloheptenes] having useful pharmacodynamic activity. More specifically, the compounds of this invention have antidepressant activity. In a standard mouse dose range procedure, these compounds produce effects similar to those of imipramine and amitryptyline at oral dosages of 50–200 mg./kg.

The novel 10',11'-dihydrospiro[cyclopropane-1,5'-5H-dibenzo(a,d)cycloheptenes] of this invention may be represented by the following general structural formula:

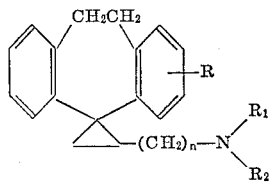

FORMULA I in which:

R represents hydrogen, halogen such as chlorine or bromine, trifluoromethyl, lower alkyl such as methyl, lower alkoxy such as methoxy or lower alkylthio such as methylthio, preferably in the 3-position of the dibenzocycloheptene portion of the ring system;

$n$ represents an integer from 0 to 2; and $R_1$ and $R_2$ each represent hydrogen, lower alkyl of from 1 to 3 carbon atoms or when taken together with the nitrogen atom to which they are attached, represent a heterocyclic amino group containing up to 15 carbon atoms, for example a pyrrolidine, piperidine, N'-methylpiperazine, N'-(β-hydroxyethyl)-piperazine or N'-(β-acetoxyethyl)-piperazine ring.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethanedisulfonic, sulfamic, succinic, cyclohexylsulfamic, fumaric, maleic, benzoic and the like. These salts are readily prepared by methods known to the art.

The compounds of this invention when R in Formula I above is different from hydrogen may be present as cis-trans isomers due to the geometrical arrangement of the dibenzocycloheptene ring substituent and the amino moiety with respect to the spiro ring system and further as d, 1 optical isomers. Unless otherwise specified in the description and accompanying claims, it is intended to include all isomers, whether separated or mixtures thereof.

The novel 10',11'-dihydrospiro[cyclopropane-1,5'-5H-dibenzo(a,d)cycloheptenes] of this invention are prepared by several methods, the choice of which depending on the definitions of $n$, $R_1$ and $R_2$. The starting materials for these methods are generally 10',11'-dihydrospiro[cyclopropane - 1,5' - 5H - dibenzo(a,d)cycloheptene] - 2 - carboxylic acids having the formula:

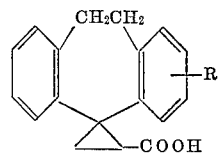

FORMULA II in which R is as defined in Formula I. These compounds are prepared from appropriate 10,11-dihydro-5H-dibenzo [a,d]-cyclohepten-5-ones which are known in the art. Thus, the dibenzocycloheptenone is reacted with a lower alkyl lithium, preferably methyl lithium, to give the 5-methyl-5-ol derivative which is dehydrated, advantageously by heating in a dimethylsulfoxide solution, to give the corresponding 10,11-dihydro-5-methylene-5H-dibenzo[a,d]cycloheptene. The latter is reacted with ethyl diazoacetate to give an ethyl 10',11'-dihydrospiro[cyclopropane - 1,5' - 5H-dibenzo[a,d]cyclohepten]-2-carboxylate which is hydrolyzed with alkali to give the carboxylic acid of Formula II. When the dibenzocycloheptene ring is substituted by other than hydrogen as defined by R above, a mixture of isomeric carboxylic acids is obtained which can be separated by fractional crystallization.

The useful compounds of Formula II are converted to amino compounds of this invention by several routes. Reaction of the carboxylic acid with either a thionyl halide or a lower alkyl haloformate gives the corresponding acid halide or lower alkyl mixed anhydride which is then treated with ammonia, a monoalkylamine, a dialkylamine or a heterocyclic amine to give a 2-carboxamido-10',11'-dihydrospiro[cyclopropane - 1,5' - 5H-dibenzo(a,d)cycloheptene]. Reduction of the amide with, for example, lithium aluminum hydride gives the corresponding 2-aminomethyl derivatives of Formula I.

The novel compounds of the invention represented by Formula I above where $n$ is 2 are prepared by similar reaction of the carboxylic acid of Formula II with either a thionyl halide or a lower alkyl haloformate to give the corresponding acid halide or lower alkyl mixed anhydride which is then treated with diazomethane to yield a 2-diazoacetyl-10',11'-dihydrospiro[cyclopropane-1,5' - 5H-dibenzo(a,d)cyclohepten]. A methanolic solution of the latter is rearranged with silver benzoate to give the methyl 10',11'-dihydrospiro[cyclopropane-1,5'-5H - dibenzo-(a,d)cycloheptene]-2-acetate which is hydrolyzed with alkali to give the 2-acetic acid derivative. Conversion of the acid to either an acid chloride or lower alkyl mixed anhydride, followed by reaction with ammonia, a monoalkylamine, a dialkylamine or a heterocyclic amine to give a 2-acetamido-10',11'-dihydrospiro[cyclopropane-1,5'-5H-dibenzo(a,d)cycloheptene] and reduction of the amide with, for example, lithium aluminum hydride yields the 2-aminoethyl products of Formula I.

Alternatively, the diazoketone above is rearranged with silver oxide in the presence of an amine to give the acetamido derivative directly which is then reduced to the 2-aminoethyl products.

To prepare the compounds of Formula I where $n$ is 0, the carboxylic acid of Formula II is converted to either an acid halide or a lower alkyl mixed anhydride as described above and this derivative is then treated with sodium azide to give the corresponding acid azide. The acid azide is thermally decomposed by heating in an inert organic solvent to give the corresponding isocyanate. The resulting isocyanate is converted to compounds of Formula I where $n$ is 0 by: (a) hydrolysis with a mineral acid such as hydrochloric acid or an alkali metal hydroxide such as sodium or potassium hydroxide at elevated temperatures to give the primary amines or (b) reaction with a lower alkyl magnesium halide or lower alkanol to give an N-lower acyl or N-lower carbalkoxy amine, respectively, which is either reduced directly with, for example, lithium aluminum hydride to give an N-lower alkyl amine or further reacted with a lower alkyl iodide to give an N-lower alkyl-N-lower acyl or N-lower alkyl-N-lower carbalkoxy amine, respectively, which is reduced with, for example, lithium aluminum hydride to give an N,N-dialkylamine.

The compounds of Formula I above where $R_1$ and $R_2$ together represent a heterocyclic amino moiety are prepared also from the corresponding primary amines. The pyrrolidinyl and piperidinyl derivatives are prepared from the primary amine and 1,4-dibromobutane and 1,5-dibromopentane, respectively, in an organic solvent refluxing at a temperature from 100–150° C. and in the presence of potassium carbonate. Similar reaction of the primary amine with methyl bis-($\beta$-chloroethyl)amine gives the N'-methylpiperazinyl derivative.

The novel compounds of this invention may be administered orally or parenterally in conventional dosage forms such as tablets, capsules, injectables or the like, by incorporating the appropriate dose of a compound of Formula I with carriers according to accepted pharmaceutical practices.

The foregoing is a general description of the main synthetic routes in the preparation of 10',11'-dihydrospiro[cyclopropane-1,5'-5H - dibenzo(a,d)cycloheptenes] of this invention. It will be readily apparent to one skilled in the art that variations of these procedures are possible. The following examples illustrate these procedures but should not be construed as limiting the invention to the specific compounds prepared thereby. Where isomers can exist, the examples are intended to read on the similar employment of either isomer.

PREPARATIONS (A) 10',11'-dihydrospiro[cyclopropane-1,5'-5H-dibenzo-(a,d)cycloheptene]-2-carboxylic acid To 300 ml. of a 5.21% solution of methyl lithium in ether (approximately 11.1 g.) is added slowly with stirring a suspension of 45.7 g. of 10,11-dihydro-5H-dibenzo-[a,d]cyclohepten-5-one in 200 ml. of ether. The solution is stirred and refluxed for two hours and then poured slowly into 1 l. of ice-water and 50 ml. of concentrated hydrochloric acid. The separated aqueous layer is extracted with ether and the combined dried extract is concentrated in vacuo to give 10,11-dihydro-5-methyl-5H-dibenzo[a,d]cyclohepten-5-ol, M.P. 135–138° C.

A mixture of 45.9 g. of the above alcohol and 100 ml. of dimethylsulfoxide is heated at 173° C. for 20 hours. The solution is allowed to cool, poured into 750 ml. ice-water and extracted with ether. The dried extract is concentrated to give 10,11-dihydro-5-methylene-5H-dibenzo-[a,d]cycloheptene, M.P. 66–68.5° C.

To a refluxing and stirred suspension of 1.0 g. of cupric sulfate powder in 500 ml. of dry toluene is added dropwise a solution of 38.7 g. of the above 5-methylene compound and 28.5 g. of ethyl diazoacetate in 500 ml. of dry toluene. The resulting mixture is refluxed for 30 minutes after addition is completed, filtered and the filtrate is concentrated in vacuo. The residue is distilled to give ethyl 10',11'-dihydrospiro[cyclopropane-1,5'-5H-dibenzo(a,d)cycloheptene]-2-carboxylate, B.P. range 150–190° C./0.5–1.5 mm.

To a solution of 52.8 g. of the above carboxylate in 500 ml. of ethanol is added a solution of 33.6 g. of potassium hydroxide in 100 ml. of water and the resulting solution is stirred and refluxed for two hours. The cooled reaction mixture is diluted with water and ether and the separated aqueous layer is washed with ether, then acidified with concentrated hydrochloric acid and extracted with ether. The extract is washed with saturated sodium chloride solution, dried and evaporated in vacuo to give 10',11'-dihydrospiro[cyclopropane - 1,5'-5H - dibenzo-(a,d)cycloheptene]-2-carboxylic acid, M.P. 197–200° C.

(B) 10',11'-dihydrospiro[cyclopropane-1,5'-dibenzo (a,d)-cycloheptene]-2-acetic acid A mixture of 10.0 g. of 10',11'-dihydrospiro[cyclopropane - 1,5' - 5H - dibenzo(a,d)cycloheptene]-2-carboxylic acid and 10 ml. of thionyl chloride is allowed to stand at room temperature for one hour, then is heated at reflux for 15 minutes. The solution is concentrated in vacuo and the residue stripped with toluene. The residual acid chloride is then dissolved in 50 ml. of ether and the ether solution is added to a solution of diazomethane in 400 ml. ether (prepared by addition, in portions, of 23.2 g. of N-methyl-N'-nitro-N-nitrosoguanidine to a mixture of 60 ml. of 50% potassium hydroxide solution and 150 ml. of ether at 0° C., decantation of ether solution, extraction of aqueous portion with ether, and drying of ether solution). The reaction mixture is allowed to stand at room temperature for 12 hours and filtered to give 2-diazoacetyl - 10',11' - dihydrospiro[cyclopropane - 1,5'-5H-dibenzo(a,d)cycloheptene, M.P. 164–165° C. (d.).

To a stirred suspension of 2.9 g. of the above diazoketone in 30 ml. of methanol is added a solution of 0.3 g. of silver benzoate (prepared by reaction of equimolar quantities of sodium benzoate and silver nitrate in an aqueous medium) in 3 ml. of triethylamine. The mixture is stirred at room temperature for 15 minutes, then refluxed for one hour, filtered and the filtrate concentrated in vacuo. The residue is suspended in water, extracted with ether, and the dried extract concentrated to give the methyl ester of the acetic acid derivative.

To a solution of this ester in 25 ml. of ethanol is added a solution of 1.0 g. of potassium hydroxide in 5 ml. of water. The mixture is stirred and refluxed for one hour, then concentrated in vacuo. The residue is dissolved in water and extracted with ether. The aqueous portion is made acidic with acetic acid, extracted with ether and the dried extract concentrated. The residue is extracted with hot hexane, the dried extract concentrated and the residue recrystallized from aqueous ethanol to give 10',11'-dihydrospiro[cyclopropane - 1,5' - 5H-dibenzo(a,d)cyclohepten]-2-acetic acid, M.P. 142–143° C.

(C) 3' - trifluoromethyl - 10',11' - dihydrospiro[cyclopropane - 1,5' - 5H - dibenzo(a,d)cycloheptene] - 2 - carboxylic acid A solution of 8.8 g. of methyl lithium in 1 l. of dry ether is stirred while 100 g. of 3-trifluoromethyl-10,11-dihydro-5H-dibenzo[a,d]cyclohepten-5-one is added in portions, at a rate so that reflux is maintained. After addition is completed the mixture is stirred and refluxed for two and one-half hours and then poured slowly into 1 l. of ice-water and 50 ml. of concentrated hydrochloric acid. The separated aqueous layer is washed with ether and the combined ether solution is water-washed, dried and evaporated in vacuo to give 3-trifluoromethyl-5-methyl-10,11-dihydro-5H-dibenzo[a,d]cyclohepten-5-ol.

A mixture of 105 g. of the above alcohol and 300 ml. of dimethylsulfoxide is heated in an oil bath at 174° C. for 18 hours. The solution is poured into 2 l. of ice-water and extracted with ether. The extract is water-washed, dried and evaporated in vacuo to give 3-trifluoromethyl-5-methylene - 10,11-dihydro-5H-dibenzo[a,d]-cycloheptene as an oil.

To a mixture of 0.6 g. of cupric sulfate in 250 ml. of dry toluene, with stirring and refluxing, is added dropwise a solution of 49 g. of the above 5-methylene compound and 25 ml. of ethyl diazoacetate in 250 ml. of dry toluene. The reaction mixture is stirred and refluxed for one hour and an additional 15 ml. of ethyl diazoacetate in 100 ml. of dry toluene is added dropwise, with a subsequent addition 30 minutes later. One hour after the final addition, with continued refluxing, the mixture is filtered and the filtrate evaporated in vacuo to give ethyl 3'-trifluoromethyl - 10',11' - dihydrospiro[cyclopropane - 1,5'-5H-dibenzo(a,d)cycloheptene]-2-carboxylate.

A mixture of the above carboxylate in 500 ml. of ethanol and 30 g. of potassium hydroxide in 50 ml. of water is stirred and refluxed for two hours, then evaporated in vacuo. The residue is dissolved in water, washed with ether and the aqueous solution acidified with concentrated hydrochloric acid. The acidic solution is extracted with ether and the dried extract is evaporated. The residue is triturated with 200 ml. of methylene chloride and cooled to 0° C. to give 3'-trifluoromethyl-10',11'-dihydrospiro[cyclopropane - 1,5' - 5H-dibenzo(a,d)cycloheptene]-2-carboxylic acid.

Treatment of this carboxylic acid as outlined in part B above yields 3' - trifluoromethyl - 10',11' - dihydrospiro[cyclopropane - 1,5' - 5H - dibenzo(a,d)cycloheptene]-2-acetic acid.

(D) X-substituted-10,11-dihydrospiro[cyclopropane-1,5'-5H - dibenzo(a,d)cycloheptene] - 2-carboxylic and -2-acetic acids By employing in part A above the following cycloheptenones, as illustrated in part C, with similar subsequent reaction as in part B, there are obtained corresponding carboxylic and acetic acid starting materials:

3-chloro-10,11-dihydro-5H-dibenzo[a,d]cyclohepten-5-one 3-bromo-10,11-dihydro-5H-dibenzo[a,d]cyclohepten-5-one 3-methoxy-10,11-dihydro-5H-dibenzo[a,d]cyclohepten-5-one 3-methyl-10,11-dihydro-5H-dibenzo[a,d]cyclohepten-5-one 3-methylthio-10,11-dihydro-5H-dibenzo[a,d]cycloheptenten-5-one

EXAMPLE 1

A mixture of 4.6 g. of 10',11'-dihydrospiro-[cyclopropane - 1,5' - 5H - dibenzo(a,d)cycloheptene]-2-acetic acid and 10 ml. of thionyl chloride is allowed to stand at room temperature for one hour, then heated at reflux for 30 minutes, concentrated in vacuo and the residue stripped with toluene. The residual acid chloride is dissolved in 50 ml. of ether and added dropwise to a solution of 4.5 g. of dimethylamine in 125 ml. of ether. The mixture is stirred at room temperature for 15 minutes, then refluxed for one hour. A 40% aqueous solution of dimethylamine (50 ml.) is added and the mixture stirred an additional 15 minutes. The separated organic layer is washed with a saturated solution of sodium chloride, dried and concentrated to give the 2-(N,N-dimethylacetamido)-10',11'-dihydrospiro[cyclopropane - 1,5' - 5H-dibenzo(a,d)cycloheptene].

A suspension of the above amide in 50 ml. of ether is added to a suspension of 3.4 g. of lithium aluminum hydride in 250 ml. of ether and the mixture is stirred and refluxed for two hours. After standing at room temperature of 12 hours, the reaction mixture is decomposed by the addition, in sequence, of 3.5 ml. of water, 3.5 ml. of 10% sodium hydroxide solution and 11 ml. of water, filtered and the filtrate concentrated in vacuo. The residue is distilled to give 2-(N,N-dimethylaminoethyl)-10',11'-dihydrospiro[cyclopropane - 1,5' - 5H-dibenzo(a,d)cycloheptene], B.P. 165–170° C./0.3 mm.: hydrochloride salt, M.P. 191–193° C.

Similarly, by employing in the above reaction sequence 4.4 g. of 3'-methyl-10',11'-dihydrospiro[cyclopropane-1,5'-5H-dibenzo(a,d)cycloheptene]-2-acetic acid there is obtained as a final product 3'-methyl-2-(N,N-dimethylaminoethyl) - 10',11' - dihydrospiro[cyclopropane-1,5'-5H-dibenzo(a,d)cycloheptene].

EXAMPLE 2

To a mixture of 3.7 g. of 3'-trifluoromethyl-10',11'-dihydrospiro[cyclopropane - 1,5'-5H - dibenzo(a,d) - cycloheptene]-2-carboxylic acid and 3 ml. of triethylamine, cooled to 0° C., is added 2 ml. of ethyl chloroformate in acetone. The mixture is stirred for 15 minutes and then 4.4 g. of N-(β-hydroxyethyl)piperazine in acetone is added with cooling. After stirring for three hours at room temperature, the reaction mixture is poured into cold water and extracted with ether. The dried extract is evaporated to give 3'-trifluoromethyl-2-[N-(β-hydroxyethyl) - N' - piperazinoyl] - 10',11' - dihydrospiro[cyclopropane-1,5'-5H-dibenzo(a,d)cycloheptene].

To a suspension of 1.0 g. of lithium aluminum hydride in ether is added a suspension of 3.7 g. of the above piperazinyl derivative in ether and the mixture stirred and refluxed for eight hours. After standing overnight at room temperature, the reaction mixture is decomposed, filtered and the filtrate acidified with ethanol-ethereal hydrogen chloride. Addition of excess ether precipitates the solid 3' - trifluoromethyl - 2 - [N-(β-hydroxyethyl)-N'-piperazinylmethyl] - 10',11' - dihydrospiro[cyclopropane - 1,5'-5H - dibenzo(a,d)cycloheptene]hydrochloride. Acetylation with acetyl chloride yields the corresponding β-acetoxyethyl derivative.

EXAMPLE 3

A solution of 9.4 g. of 3'-trifluoromethyl-10',11'-dihydrospiro[cyclopropane - 1,5' - 5H - dibenzo(a,d)cycloheptene]-2-acetic acid in acetone is treated with 7 ml. of triethylamine in acetone. The resulting mixture is cooled to 0° C. and 5 ml. of ethyl chloroformate in acetone is added. After stirring for 20 minutes, a solution of 7.1 g. of dimethylamine in acetone is added and stirring continued for 30 minutes with cooling and then for two hours at room temperature. The reaction mixture is poured into ice-water, extracted with methylene chloride and the dried extract evaporated. The residue is taken up in ether, extracted with 10% sodium hydroxide solution and the dried ether solution evaporated to give the solid 3' - trifluoromethyl-2-(N,N-dimethylacetamido)-10',11' - dihydrospiro[cyclopropane - 1,5' - 5H - dibenzo(a,d)cycloheptene].

To 2.5 g. of lithium aluminum hydride in ether is added a solution of 9.4 g. of the above acetamido derivative in ether and the mixture is stirred and refluxed for eight hours. After standing at room temperature overnight, the reaction mixture is decomposed, filtered and the filtrate evaporated. The residue is taken up in ethanol and treated with ethereal hydrogen chloride. Addition of excess ether precipitates the 3'-trifluoromethyl-2-(N,N-dimethylaminoethyl) - 10',11' - dihydrospiro[cyclopropane-1,5'-5H-dibenzo(a,d)cyclohepten] hydrochloride.

Similarly, by employing 11 g. of pyrrolidine or 13 g. of piperidine instead of dimethylamine in the above reaction sequence with subsequent reduction by 2.5 g. of lithium aluminum hydride there is obtained 3'-trifluoromethyl - 2 - (N-pyrrolidinylethyl) - 10',11' - dihydrospiro[cyclopropane - 1,5' - 5H - dibenzo(a,d)cycloheptene] or 3'-trifluoromethyl - 2 - (N-piperidinylethyl)-10',11'-dihydrospiro[cyclopropane - 1,5' - 5H - dibenzo(a,d)cycloheptene].

EXAMPLE 4

To a suspension of 22 g. of 10',11'-dihydrospiro[cyclopropane - 1,5' - 5H - dibenzo(a,d)cycloheptene]-2-carboxylic acid in 200 ml. of acetone is added 19 ml. of triethylamine in acetone. The mixture is cooled to −5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C., and poured into ice-water. The mixture is extracted with methylene chloride and the dried extract evaporated to give 2-(N,N-dimethylcarboxamido) - 10′,11′ - dihydrospiro[cyclopropane-1,5′-5H-dibenzo(a,d)cycloheptene], M.P. 187–190° C.

A solution of 27 g. of the above carboxamido derivative in 225 ml. of ether is added to a suspension of 8 g. of lithium aluminum hydride in ether and the mixture refluxed for five and one-half hours. The reaction mixture is decomposed, filtered and the filtrate evaporated to give a solid which is dissolved in acetone. Ethereal hydrogen chloride is added to the acetone solution to yield 2 - (N,N - dimethylaminomethyl)-10′,11′ - dihydrospiro-[cyclopropane - 1,5′ - 5H - dibenzo(a,d)cycloheptene] hydrochloride, M.P. 235–237° C.

Similarly, by employing 33 g. of N-methylpiperazine instead of dimethylamine in the above reaction sequence, the corresponding 2 - (N-methyl-N′-piperazinylmethyl) 10′,11′ - dihydrospiro[cyclopropane - 1,5′ - 5H - dibenzo-(a,d)cycloheptene] is obtained.

EXAMPLE 5

To a solution of 5.9 g. of 3′-chloro-10′,11′-dihydrospiro[cyclopropane - 1,5′ - 5H-dibenzo(a,d)cycloheptene] 2-carboxylic acid in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is heated on the steam bath to decompose the acid azide. Removal of the solvent gives the residual isocyanate derivative.

To a stirred mixture of 50 ml. of 3 M methyl magnesium bromide in ether is added 6.8 g. of the above isocyanate in ether. The mixture is refluxed for two hours, cooled and 200 ml. of 10% hydrochloric acid solution is added slowly. The separated aqueous layer is extracted with ether. Concentration of the organic solutions gives 3′ - chloro - 5 - (N-acetylamino)-10′,11′-dihydrospiro-[cyclopropane - 1,5′ - 5H - dibenzo(a,d)cycloheptene].

To a solution of 7.1 g. of the above N-acetylamino derivative in 70 ml. of tetrahydrofuran is added 1.0 g. of 53.5% sodium hydride and the mixture is stirred and refluxed for one hour. A solution of 8 ml. of ethyl iodide in 25 ml. of tetrahydrofuran is added to the cooled reaction mixture which is then refluxed for four hours. An additional 8 ml. of ethyl iodide in 10 ml. of tetrahydrofuran is added and refluxing continued for 12 hours. The reaction mixture is filtered and the filtrate concentrated in vacuo. The residue is taken up in water and ether, extracted with ether and the dried solvent removed to give 3′-chloro-2-(N-acetyl - N - ethylamino)-10′,11′-dihydrospiro[cyclopropane-1,5′-5H-dibenzo(a,d)cycloheptene].

A solution of the above N-acetyl-N-ethylamino derivative (7.6 g.) in ether is added to a suspension of 5.0 g. of lithium aluminum hydride in ether and the mixture stirred and refluxed for six hours. Decomposition of the metal complex yields an oil which is treated in acetone solution with ethereal hydrogen chloride to give 3′-chloro-2-(N,N-diethylamino) - 10′,11′ - dihydrospiro[cyclopropane-1,5′-5H-dibenzo(a,d)cycloheptene] hydrochloride.

Direct hydrolysis of the above isocyanate derivative yields 3′-chloro-2-amino - 10′,11′ - dihydrospiro[cyclopropane-1,5′-5H-dibenzo(a,d)cycloheptene].

EXAMPLE 6

To a suspension of 4 g. of lithium aluminum hydride in ether is added a solution of 9.6 g. of 3′-chloro-2-(N-acetylamino) - 10′,11′ - dihydrospiro[cyclopropane-1,5′-5H-dibenzo(a,d)cycloheptene] (prepared as described in Example 5) in ether and the mixture stirred and refluxed for eight hours. The reaction mixture is decomposed, filtered and the filtrate evaporated to give 3′-chloro-2-(N-monoethylamino) - 10′,11′ - dihydrospiro[cyclopropane-1,5′-5H-dibenzo(a,d)cycloheptene].

EXAMPLE 7

To a suspension of 9.0 g. of 10′,11′-dihydrospiro[cyclopropane-1,5′-5H-dibenzo(a,d)cycloheptene]-2 - carboxylic acid in 60 ml. of acetone is added 8 ml. of triethylamine in acetone, cooled to −5° C., 6 ml. of ethyl chloroformate in acetone is added and the mixture is stirred for 15 minutes in the cold. A solution of 4.4 g. of sodium azide in water is added, stirred for 30 minutes, poured into ice-water and extracted with toluene. The dried extract is heated until gas evolution ceases and then the solvent is removed to give the corresponding isocyanate derivative. The latter (11.7 g.) is dissolved in 60 ml. of ethanol and stirred and refluxed for two hours. Removal of the solvent in vacuo gives the ethyl carbamate derivative.

A solution of 10.0 g. of the above carbamate in 50 ml. of dimethylsulfoxide is added to a suspension of 1.4 g. of 55.6% sodium hydride (mineral oil) in 35 ml. of dimethylsulfoxide. The mixture is heated briefly, cooled to 20° C. and 7 ml. of methyl iodide is added, maintaining the temperature between 15–20° C. This mixture is heated at 55–60° C. for 30 minutes, poured into 250 ml. of ice-water, extracted with ether and the dried extract evaporated to give 2-(N-methyl-N-carbethoxyamino)-10′,11′-dihydrospiro[cyclopropane-1,5′-5H - dibenzo(a,d) cycloheptene].

To a suspension of 2.5 g. of lithium aluminum hydride in ether is added a solution of 10.1 g. of the above N-methyl carbamate derivative in ether and the mixture is refluxed for four hours. The reaction mixture is decomposed, filtered, and the ether removed to give 2-(N,N-dimethylamino) - 10′,11′ - dihydrospiro[cyclopropane-1,5′-5H-dibenzo(a,d)cycloheptene] which is converted to the hydrochloride salt, M.P. 221–225° C.

Similarly, 3′-methylthio-10′,11-dihydrospiro[cyclopropane-1,5′-5H-dibenzo(a,d)cycloheptene]-2-carboxylic acid yields 3′-methylthio-2-(N,N-dimethylamino)-10′,11′-dihydrospiro[cyclopropane - 1,5′-5H - dibenzo(a,d)cycloheptene].

EXAMPLE 8

To a suspension of 29 g. of 3′-bromo-10′,11′-dihydrosprio[cyclopropane-1,5′- 5H - dibenzo(a,d)cycloheptene]-2-acetic acid in 200 ml. of acetone is added 19 ml. of triethylamine in acetone. The mixture is cooled to −5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give 3′-bromo-2-(N,N-dimethylacetamido) - 10′,11′ - dihydrospiro[cyclopropane-1,5′-5H-dibenzo(a,d)cycloheptene].

A solution of 35.2 g. of the above acetamido derivative in 225 ml. of ether is added to a suspension of 8 g. of lithium aluminum hydride in ether and the mixture refluxed for six hours. The reaction mixture is decomposed, filtered and the filtrate evaporated to give 3′-bromo-2-(N,N-dimethylaminoethyl) - 10′,11′ - dihydrospiro[cyclopropane-1,5′-5H-dibenzo(a,d)cycloheptene].

Similarly, by employing in the above reaction sequence 28.7 g. of 3′-methoxy-10′,11′-dihydrospiro[cyclopropane-1,5′-5H-dibenzo(a,d)cycloheptene]-2-acetic acid there is obtained as a final product 3′-methoxy-2-(N,N-dimethylaminoethyl) - 10′,11′ - dihydrospiro[cyclopropane-1,5′-5H-dibenzo(a,d)cycloheptene].

What is claimed is:
1. Chemical compounds selected from the group consisting of a free base and salts with pharmaceutically acceptable acids, said free base having the formula:

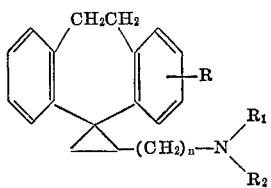

in which:

R is hydrogen, chlorine, bromine, trifluoromethyl, methyl, methoxy or methylthio;

$n$ represents an integer of from 0 to 2; and $R_1$ and $R_2$, when taken individually, are each hydrogen or lower alkyl of from 1 to 3 carbon atoms.

2. A chemical compound of the formula:

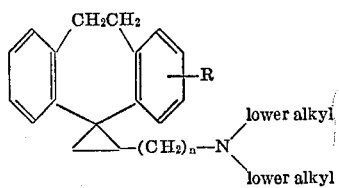

in which:

R is hydrogen, chlorine, bromine, trifluoromethyl, methyl, methoxy or methylthio;

$n$ represents an integer of from 0 to 2; and lower alkyl is from 1 to 3 carbon atoms.

3. 2 - (N,N-dimethylaminoethyl) - 10′,11′ - dihydrospiro[cyclopropane - 1,5′-5H-dibenzo(a,d)cycloheptene].

4. 3′ - trifluoromethyl - 2-(N,N-dimethylaminoethyl)- 10′,11′ - dihydrospiro[cyclopropane - 1,5′-5H - dibenzo - (a,d)cycloheptene].

5. 2 - (N,N-dimethylamino) - 10′,11′ - dihydrospiro - [cyclopropane-1,5′-5H-dibenzo(a,d)cycloheptene].

6. 2 - (N,N-dimethylaminomethyl) - 10′,11′ - dihydrospiro[cyclopropane - 1,5′-5H-dibenzo(a,d)cycloheptene].

7. 3′ - methylthio - 2 - (N,N-dimethylamino) - 10′,11′- dihydrospiro[cyclopropane - 1,5′ - 5H-dibenzo(a,d)cycloheptene].

References Cited

Cope et al., "Jour. Amer. Chem. Soc.," vol. 73, pp. 1675 and 1677 (1951).

Mychajlyszyn et al., "Coll. of Czech. Chem. Comm.," vol. 24, pp. 3955–56 (1959).

CHARLES B. PARKER, Primary Examiner.

R. V. HINES, Assistant Examiner.

U.S. Cl. X.R.

260—501.1, 268, 293, 293.4, 294, 294.7, 471, 544, 546, 590, 609, 612, 618, 669, 501.12, 501.18, 501.19, 469, 470, 473, 559, 562, 141, 349, 326.3, 326.5, 326.8, 326.84, 453, 516, 520, 558, 564, 575, 578, 571, 576, 999